United States Patent [19]

Musick et al.

[11] 4,046,625

[45] Sept. 6, 1977

[54] AUTOMATIC MOTION INHIBIT SYSTEM FOR A NUCLEAR POWER GENERATING SYSTEM

[75] Inventors: Charles Ronald Musick, Vernon; Jose Marcelo Torres, Simsbury, both of Conn.

[73] Assignee: Combustion Engineering, Inc., Windsor, Conn.

[21] Appl. No.: 605,706

[22] Filed: Aug. 18, 1975

[51] Int. Cl.² .............................................. G21C 7/00
[52] U.S. Cl. ........................................ 176/24; 176/22
[58] Field of Search ............................ 176/20, 22-24, 176/38, 55, 60; 60/660, 664, 665, 667

[56] References Cited

U.S. PATENT DOCUMENTS

| | | | |
|---|---|---|---|
| 3,061,533 | 10/1962 | Shannon et al. | 176/56 |
| 3,202,804 | 8/1965 | Schlein | 176/24 |
| 3,207,669 | 9/1965 | Fawcett et al. | 176/24 |
| 3,284,312 | 11/1966 | West | 176/22 |
| 3,341,422 | 9/1967 | Gilbert | 176/22 |
| 3,437,557 | 4/1969 | Kaipainen et al. | 176/20 |
| 3,671,390 | 6/1972 | Hogle | 176/24 |
| 3,778,347 | 12/1973 | Giras et al. | 176/24 |
| 3,931,500 | 1/1976 | Berkebile et al. | 176/24 |
| 3,933,580 | 1/1976 | Aleite et al. | 176/20 R |

FOREIGN PATENT DOCUMENTS

| | | | |
|---|---|---|---|
| 2,013,346 | 9/1971 | Germany | 176/38 |

*Primary Examiner*—Samuel W. Engle
*Assistant Examiner*—S. A. Cangialosi
*Attorney, Agent, or Firm*—Richard H. Berneike; Stephen L. Borst

[57] ABSTRACT

An automatic motion inhibit system for a nuclear power generating system for inhibiting automatic motion of the control elements to reduce reactor power in response to a turbine load reduction. The system generates a final reactor power level setpoint signal which is continuously compared with a reactor power signal. The final reactor power level setpoint is a setpoint within the capacity of the bypass valves to bypass steam which in no event is lower in value than the lower limit of automatic control of the reactor. If the final reactor power level setpoint is greater than the reactor power, an inhibit signal is generated to inhibit automatic control of the reactor.

6 Claims, 5 Drawing Figures

AUTOMATIC MOTION INHIBIT SYSTEM FOR A NUCLEAR POWER GENERATING SYSTEM

BACKGROUND OF THE INVENTION

The present invention relates to a control system for a nuclear power generating system and more particularly to a control system for preventing unnecessary reactor power reductions.

The principles for the generation of powr by a nuclear reactor have been well established and are well understood. Briefly, the reactor contains uranium or plutonium fuel elements in a core arrangement. Through the mechanism of neutron absorption and nuclear fission of the uranium or plutonium, large amounts of energy are released. This released energy manifests itself in the form of heat which is utilized to generate electricity. In the pressurized water reactor context, the heat is transferred to a primary coolant which continuously circulates through the core and carries the generated heat to a heat exchange boundary where a secondary coolant or working fluid is heated. Ordinarily the secondary coolant is water and is vaporized at the heat exchange boundary to produce steam. The steam is then circulated in a secondary system to a turbine for its ultimate use. The turbine is caused to turn at a predetermined rate and is connected to a generator for the ultimate transformation of the thermal energy to electrical energy.

All elements of this system are functionally interrelated. As an example, an increase in reactor power increases the rate of energy transferred to the primary coolant which in turn increases the rate of energy transferred to the secondary coolant causing more energy provided to the turbine for its ultimate transformation in electrical energy. Conversely, if less electrical energy is required, the energy requirement of a turbine diminishes. The steam flow to the turbine is reduced and consequently the turbine utilizes less of the thermal energy being transferred to the secondary coolant and an energy backup results. Since less energy is being drawn from the steam supply system when the steam flow is reduced, both the temperature and the pressure of the steam generator secondary side are caused to increase. The effect of this increase on the secondary coolant temperature is reflected on the primary side of the heat exchanger since less energy is being transferred across the heat exchange boundary. Accordingly, the primary coolant temperature and pressure increases.

Generally, most nuclear power generating systems are controlled such that reactor power level follows the turbine load. That is, changes in turbine load are sensed by the control system which in turn causes the reactor power level to be changed to be in agreement with the turbine load so that the energy generated by the reactor is equivalent to the energy utilized by the turbine. Normally, this is accomplished by the reactor regulating system which automatically drives control or regulating elements into or out of the reactor core in response to turbine load changes to change the power output of the reactor. It should be noted that most of the automatic control systems of typical nuclear power generating systems are only operable to provide automatic control of the reactor above a certain power level, generally 15% of a full power level output. Below this power level the plant is controlled manually. The reason for the low limit on automatic control is that system stability deteriorates with decreasing power level.

Generally, as noted herein above, if the reactor power is not reduced in response to a turbine load rejection or reduction, then serious increases may result in primary and secondary pressure and temperature. Such increases may also result even with the reactor regulating system operating to reduce the reactor power if the magnitude and rate of energy backup exceed certain values. This is a result of the fact that the regulating rods can only be advanced into and out of the core at a limited maximum speed.

Accordingly, changes in reactor power inherently occur at slower rates than can be imposed on the turbine. If the reactor power level is not reduced rapidly enough to compensate for the energy backup and the temperature and pressure of the primary system increases uncontrollably, then protective or control systems come into operation to trip the reactor and/or to open steam relief valves in order to avoid an overpressurization in the primary and secondary systems. If the uncontrolled increase in pressure is not avoided by these measures the safety pressure valves of either the primary or the secondary side are caused to lift. This is an undesirable occurrence since it may put the system out of operation until the seals of the safety valves have been remachined and reseated. Another undesirable effect is that the reactor is tripped unnecessarily upon a large or rapid load rejection that would otherwise not require taking the reactor out of operation. Such a trip temporarily removes the nuclear power plant as a supplier and a time consuming and expensive reactor startup procedure must be followed before the reactor can be put back into operation as a power producer.

Also, as can be appreciated, it may be undesirable to reduce the reactor power in response to a turbine load reduction if it is not absolutely necessary. For example, if the turbine load reduction is only temporary and the reactor power is reduced to follow the turbine, then when the turbine load is increased back to its original level, a substantial time lag will result before the reactor power can be brought back to its original level. Such a lag is due to the fact that reactor power changes are limited to much slower rates than those that the turbine is capable of accommodating.

Recently, systems have been developed which allow the reactor to operate at a higher power level than those which the turbine can handle without causing overpressurization of the primary and secondary systems. One such system is disclosed in co-pending U.S. patent application Ser. No. 347,260 filed Apr. 2, 1973 entitled "Steam Relief Valve Control System for a Nuclear Reactor" by Jose Marcelo Torres and assigned to the same assignee as the present application. That application discloses the use of steam relief valve operable in response to rises in secondary system pressure to bypass excess steam to the condenser or to dump excess steam to the outside atmosphere. Therefore, by using a plurality of bypass valves which are operable to prevent overpressurization in the primary and secondary systems, it is no longer absolutely necessary to reduce reactor power in response to turbine load reductions.

SUMMARY OF THE INVENTION

Accordingly, the present invention involves the concept of limiting automatic power reduction of the reactor in the event of a turbine load reduction. More specifically in a nuclear power generating system having a nuclear core, a plurality of control elements movable within the core for controlling the power output thereof, a turbine for receiving coolant vapor, coolant vapor relief means operable to cause the coolant vapor to be deverted from the turbine, and an automatic motion control means normally responsive to changes in turbine load for automatically controlling the motion of the control elements to change the reactor power output to be in accordance with the turbine load, the automatic motion control means being inoperative below a predetermined power level, the present invention discloses apparatus and a method for inhibiting the automatic motion control means from responding to reductions in turbine load when the reactor power level drops below a setpoint called the final reactor power level setpoint. The final reactor power level setpoint is a setpoint having a value within the capacity of the coolant vapor relief means and the capacity of the turbine to carry coolant vapor away from the reactor. This setpoint is in no event smaller than the lower limit of automatic operation of the automatic motion control means.

Broadly stated, the invention involves determining a first setpoint called the real reactor power level setpoint from which the second setpoint or final reactor power level setpoint is determined. The real reactor power level setpoint is either the sum of the total capacity of the coolant vapor relief means and the capacity of the turbine to accept coolant vapor or a manually established setpoint; whichever is lower. The manual setpoint is selected to represent a power level at which the reactor will be allowed to remain in the event of a turbine load reduction. The final reactor power level setpoint is merely equivalent to the real reactor power level setpoint limited to the lower limit below which automatic operation of the automatic motion control means is terminated. After the final power level setpoint is determined, the reactor power level is measured and a continuous comparison of the reactor power level and the final power level setpoint is made. A motion inhibit signal is then generated when the final power level setpoint is greater than the reactor power level. This inhibit signal then acts to prevent the automatic motion control means for responding to the turbine load to change the reactor power level.

It should be noted that automatic operation of the automatic motion control means should only occur in the event of a turbine load reduction so that automatic operation of the automatic motion control means is not also inhibited for turbine load increases. The present invention provides means for this to be accomplished by providing the manual setpoint. Thus, the manual setpoint may be set to have a value which is below the reactor power level. Setting the manual setpoint in this manner assures that the real reactor power level setpoint is always below the reactor power regardless of the value attained by the sum of the capacity of the coolant vapor relief means and the turbine load since the real reactor power level setpoint is equal to the lower of the manual setpoint and the sum of the coolant vapor utilization means.

The reactor power level will not unnecessarily follow the turbine every time a turbine load reduction occurs. Instead the power level will run back to a power level within the capacity of the coolant vapor relief means and the turbine, where it remains stationary. Accordingly, the actual necessity and desirability of lowering the reactor power level further to be in accordance with the turbine load can be determined by analyzing the reason that caused the turbine load reduction. If the load reduction is only temporary, then it would not be desirable to decrease the reactor power further. On the other hand, if the load reduction is not temporary, then there is good reason to allow the reactor to follow the turbine and accordingly the reactor power level could be reduced either by assuming manual operator control or by setting the manual setpoint to a very low value.

DESCRIPTION OF THE PREFERRED EMBODIMENT

Figure 1:
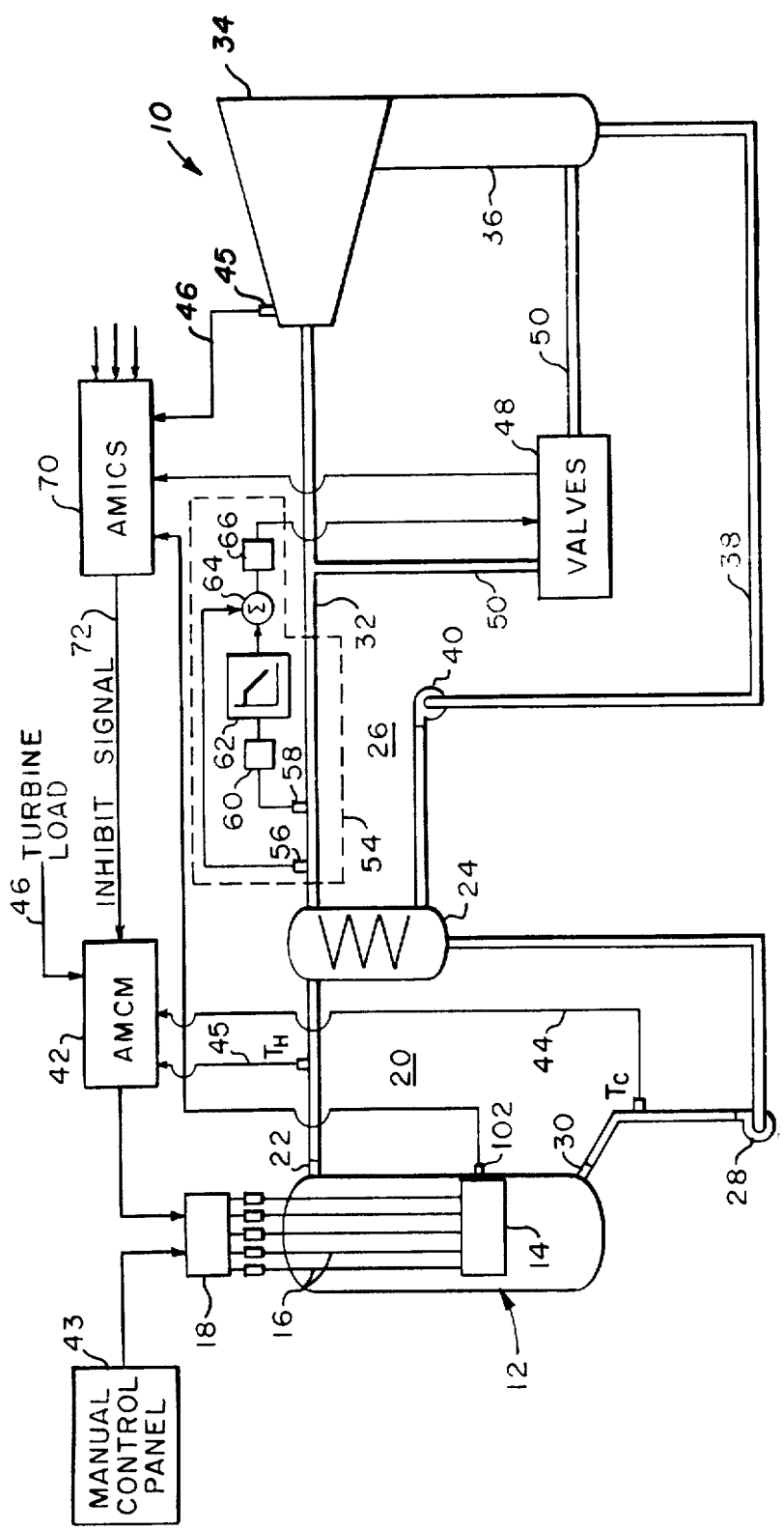
FIG. 1 is a schematic diagram of a nuclear power generating system which incorporates the automatic motion inhibit system of the present invention.

Referring now to the drawings, FIG. 1 shows a pressurized water reactor power generating system 10 in which the present invention is incorporated. However, this should not be taken as inferring a limitation on use of the present invention as the invention is equally applicable to other nuclear power generating systems. The nuclear power generating system 10 includes a nuclear reactor vessel 12 having a core 14 which is controlled by control elements 16 which penetrate the shell of the reactor vessel 12. The control elements 16 are actuated to be driven into and out of the core 14 by driving means 18. The drive means 18 can be controlled manually from the manual control panel 43 or automatically by the automatic motion control means 42 as hereinafter described. The reactor 12 and core 14 are cooled by a primary coolant system (generally indicated by 20) which provides a continuous flow of primary coolant to and from the reactor vessel 12. The coolant exits the reactor 12 at exit nozzle 22 and is circulated to a heat exchanger 24 where the coolant gives up its heat to a secondary coolant system (generally indicated by 26). After passing through the heat exchanger 24, the primary coolant is returned to the reactor 12 through pump 28 and inlet nozzle 30. The heated secondary coolant, which is usually water, is caused to pass in its vapor form through pipe 32 of the secondary control system 26 to the turbine 34. After passing through the turbine 34 the vapor or steam is quenched in condenser 36 and eventually returned through pipe 38 by a feed water pump 40 to the heat exchanger 24.

Normaly the power level of the reactor 12 and the load on the turbine 34 are maintained to be in agreement. That is, the turbine 34 is caused to accept steam at a rate which is commensurate with the reactor power level so that the energy transferred from the primary coolant system 20 to the secondary coolant system 26 is completely utilized by the turbine 34. To maintain this agreement between reactor power level and turbine load an automatic motion control means 42 is provided which controls the average reactor coolant temperature ($T_{AVE}$) to a desired value determined according to the turbine load. The automatic motion control means 42 controls the driving means 18 in response to input signals 44, 45 and 46 to lower and raise the power level. The input signals 44, 45 and 46 are indicative of the primary inlet coolant temperature ($T_C$), the primary exit coolant temperature ($T_H$) and the turbine load respectively. Of course, when $T_{AVE}$ is held steady, a balance exists between the reactor power and the turbine load.

The turbine load signal 46 is obtained by monitoring the turbine's first stage pressure detector means 45. Such detector means 45 and the techniques for deriving turbine load from turbine first stage pressure are well known in the art of reactor turbine control.

Figure 2:
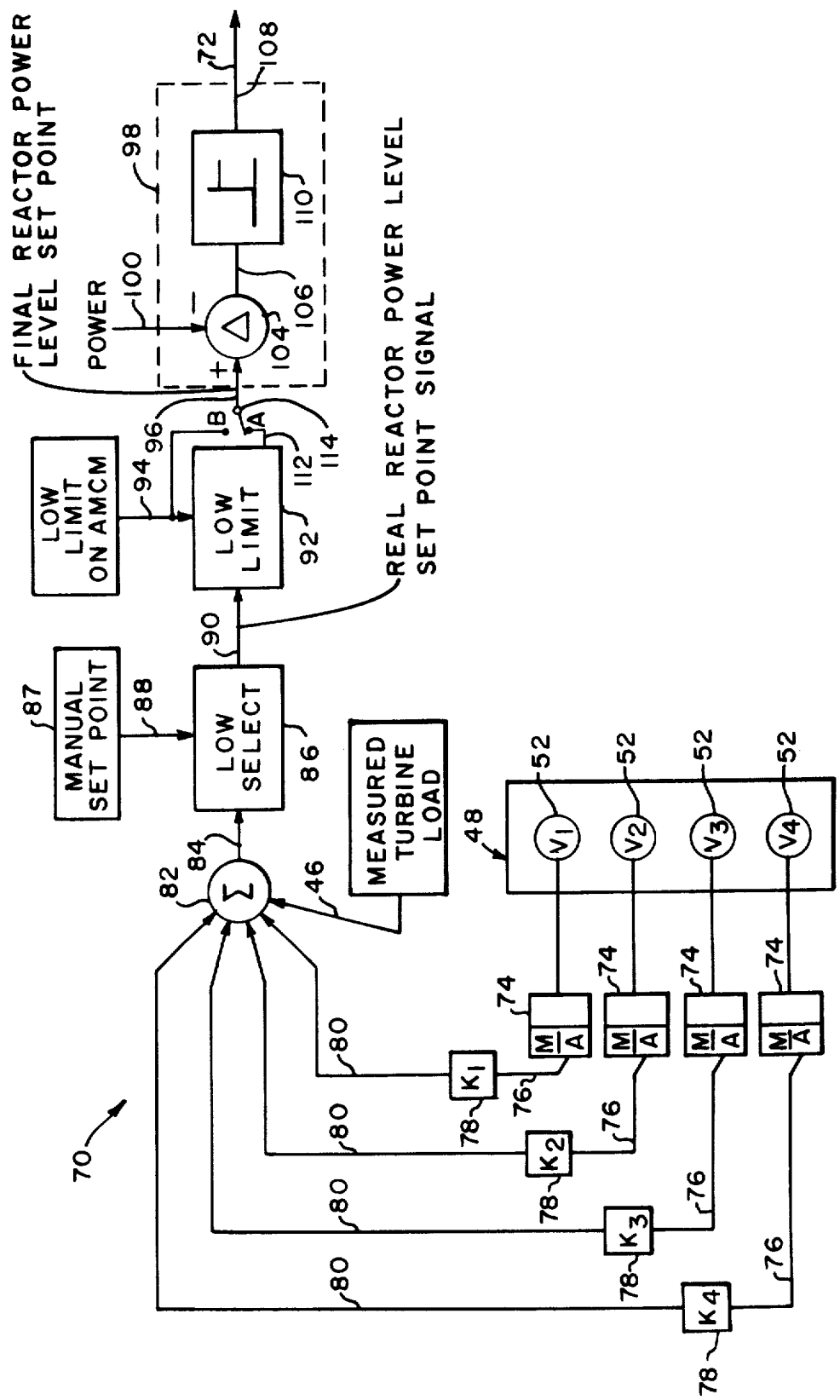
FIG. 2 is a schematic circuit diagram of the automatic motion inhibit control system of FIG. 1.

The automatic motion control means 42, however, can only slowly move the control elements 16 within the core 14 to change the reactor power, the rate of power change generally being limited to the order of 5% per minute. Accordingly, for large turbine load reductions the reactor 12 cannot rapidly follow the turbine 34 which may result in an energy back-up in the secondary coolant system 26. This in turn may cause the pressure and temperature of the coolant in the primary coolant system 20 to increase. These increases, if not compensated for, will eventually cause safety valve opening or a reactor trip. To aid in preventing excessive energy build-up in the secondary control system 26, the nuclear power generating system 10 of FIG. 1 is provided with a coolant vapor relief valve system 48. More particularly, the coolant vapor relief system 48 is a bypass valve system located in bypass conduit 50 for bypassing coolant vapor or steam from the turbine 34 directly to the condenser 36. However, it should be noted that the coolant vapor relief system 48 could also be designed to pass the steam in pipe 32 directly to the atmosphere or to both the condenser 36 and the atmosphere. As shown in FIG. 2, the bypass valve system 48 is comprised of a plurality of individual valves 52. The valves 52 are arranged in parallel fashion in the bypass conduit 50 so that if one of the valves 52 is inoperative, it will not cause the whole system 48 to be inoperative. In the event of an energy back-up in secondary coolant system 26, the valve system 48 is controlled automatically by a control system 54 to relieve the energy build-up in secondary coolant system 26 to prevent pressure and temperature increases in the primary and secondary coolant systems 20 and 26.

The particular bypass valve control system 54 shown in FIG. 1 for automatically controlling the bypass valve system 48 corresponds to the control system disclosed in previously noted co-pending application entitled "Steam Relief Valve Control System for Nuclear Reactor." It comprises a pressure sensor 56, coolant flow sensor 58, lagging means 60, pressure set point programmer 62, summation means 64, and valve controller 66. The operation of the control system 54 is as follows. Secondary coolant flow sensor 58 detects the secondary coolant flow to the secondary coolant system 26, the steam flow being used as the power index for the secondary system. The sensor 58 generates a signal commensurate with the secondary coolant flow which is in turn commensurate with the power of the system 10 and transmits this signal to a lagging means 60 which causes the transmission of the signal to be lagged. After the signal has been lagged, the signal from lagging means 60 is transmitted to the pressure setpoint programmer 62 which has been ,re-programmed to generate a pressure setpoint signal which varies according to the magnitude of the power input signal.

Figure 4:
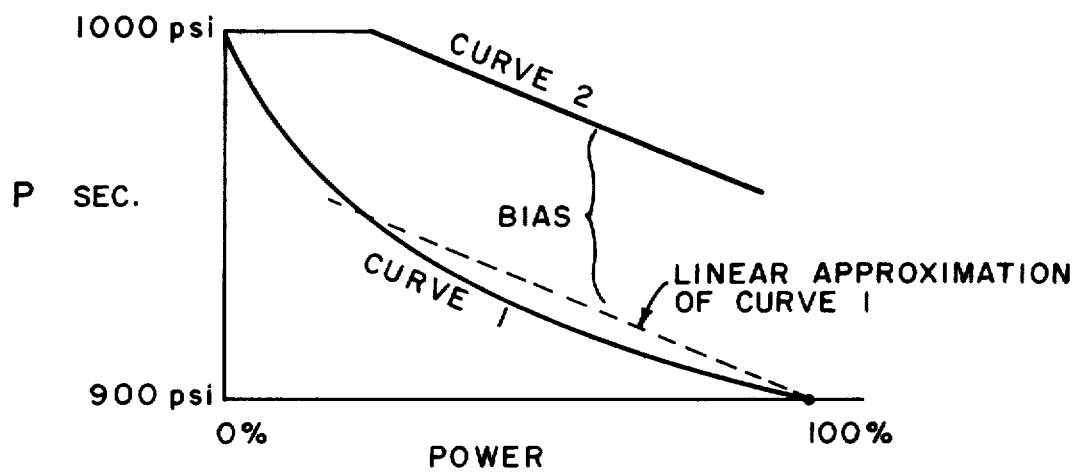
FIG. 4 is a plot of (1) the steady state curve of power vs. secondary pressure and (2) a variable secondary pressure setpoint curve for automatic operation of the bypass valve system.

Although any one of a variety of pressure setpoint programs could be used, the preferred program can be seen as curve 2 in FIG. 4. Curve 2 has been derived in advance by linearly approximating part of the steady state secondary pressure vs. power curve of Curve 1. It has been then displaced or biased by a pressure increment equivalent to the pressure jump to be expected from a 10% turbine load rejection. For values of flow indicative of load, less than about 20% of the full load, Curve 2 is horizontal and has a value of 1000 psi which is representative of the secondary pressure that is maintained in the secondary coolant system 26 during hot standby when the load is zero. Next, the pressure setpoint which lies somewhere along Curve 2 of FIG. 4, depending on the power, is transmitted to the summation point 64. At the summation point 64 the pressure setpoint is compared to the actual pressure of the secondary coolant system 26 which has been detected by the detector 56 and transmitted to the summation point 64. Summation point 64 then generates and tramsits a pressure error signal which causes the controller 66 to actuate the valves 52 of bypass valve system 48 to being the secondary pressure down to its setpoint value.

The control system is continuously operative and therefore modulates the valves 52 of the bypass valve system 48 so as to maintain the secondary pressure at a value along the setpoint program. As the power of the reactor 12 is brought into agreement with the turbine load, the bypass valves 52 will close and only when all of the valves 52 are closed will the secondary pressure drop back down to fall somewhere along Curve 1. Of course, other control systems which may or may not operate on a 10% load reduction for automatically modulating the bypass valve system 48 could be used and accordingly the present invention is not meant to be limited to the use of the particular control system described herein.

Each of the valves 52 is operative in an automatic mode and a manual mode, (designated as "A" and "M" respectively) the automatic mode denoting that the valve 52 is subject to automatic operation in the event of an energy back-up in the secondary coolant system 26. The number of valves 52 which comprise the valve system 48 and the capacities of each to bypass the steam may vary depending on the total number and capacity desired. With the embodiment shown in FIG. 2 four valves 52 are used and are identified as $V_1$, $V_2$, $V_3$ and $V_4$. If, for example, 85% total capacity is desired for the valve system 48, then one of the valves 52 may have 25% capacity and the remaining three be of 20% capacity each. The capacity of a valve 52 refers to the quantity of steam which may be passed therethrough and may be represented as a percent of power, since the power of the reactor 12 and the turbine load are related to the rate of coolant flow in the secondary coolant system 26. Generally, as is apparent hereinbelow, it is desirable to have as many valves 52 as possible since inoperation of one valve will not significantly decrease the capacity of the system 48. For example, the system could include 8 valves of 10% capacity each and one valve of 5% capacity to achieve an 85% total capacity for the system 48.

As previously indicated the drive means 18 which actuated the control elements 16 to move into and out of the core is controlled automatically by an automatic motion control means 42 (hereinafter AMCM) or manually by an operator through manual control panel 43. Also, as hereinbefore noted, the AMCM 42 for existing nuclear reactors is normally operative only above a predetermined minimum value of power. In other words, below the predetermined minimum value, which is generally of the order of 15% of the full power output of the reactor 12, automatic control of the reactor 12 is prohibited and only manual control is permitted. The reason for this limitation on automatic control is that the AMCM 42 becomes unstable at very low power levels. This instability increases as the power level is decreased. Accordingly, at these low power levels only manual control is permitted. At power levels above the low limit on automatic control, the stability of the system is acceptable and automatic operation or control is permitted. Of course, above the predetermined minimum power level the automatic control can be overridden and the reactor controlled manually if so desired. Accordingly, in the past, if the turbine load, which is equivalent to the reactor power demand since the reactor 12 is controlled to follow the turbine 34, were reduced to below the predetermined minimum power level, then the operator would have been required to switch to manual control to further reduce the power.

As noted hereinbefore it may not be desirable to reduce the reactor power in response to turbine load reductions if it is not necessary to prevent equipment damage or unsafe operation of the reactor 12. This is especially true if the load reduction is only temporary such as where there has been a significant reduction in load on the electrical network grid (i.e. separation of the plant 10 from the grid or separation of parts of interconnected systems from the grid). The use of the bypass valve system 48 eliminates the absolute necessity of reducing reactor power in response to turbine load reduction since it will assure against overpressurization of the primary and secondary coolant systems 20, 26 while the reactor 12 is maintained at an elevated power level if the capacity of the available valves 52 is sufficient.

Accordingly, an automatic motion inhibit system 70 has been provided for the nuclear power generating system 10 of FIG. 1 for inhibiting automatic control of the reactor 12 in response to turbine load changes if certain conditions exit. The automatic motion inhibit system 70 is designed to first determine the real reactor power level setpoint (hereinafter RRPLSP). This is the lower of (a) the sum of the total valve capacity of the bypass valve system 48 and the turbine load signal 46 or (b) a manually set value which is generally below the operating power level. Next, the final reactor power level setpoint (hereinafter denoted FRPLSP) is determined which is equivalent to the RRPLSP limited to a lower limit equivalent to the predetermined power level below which operation of the AMCM 42 is prohibited. The FRPLSP is then continuously compared with the reactor power and an automatic motion inhibit signal 72 is generated to inhibit operation of the AMCM 42 when the FRPLSP is greater than the power level of the reactor 12. This insures that the reactor 12 will automatically come to a stable configuration at a power level that is within the capacity of the bypass valve system 48 to divert coolant vapor and the turbine 34 to receive coolant vapor following a turbine load reduction. To limit generation of the motion inhibit signal 72 only in the event of turbine load reductions, a manually adjustable power level setpoint is provided which is to be set at a power level below the operating power level of the reactor. This insures that the RRPLSP will be below the reactor power and accordingly operation of the AMCM 42 can then only be inhibited when the power falls at least below the manual power level setpoint. This permits operation of the power system with its normal operating fluctuations and power maneuvers without preventing the operation of the automatic motion control means. Accordingly the reactor operator will normally set the manual setpoint at a positon which would not interfere with normal reactor fluctuations or power maneuvers.

The schematic circuit diagram for the automatic motion inhibit control system can be seen in FIG. 2. The system first determines the total capacity of the nuclear vapor generating system to carry coolant vapor away from the nuclear core in the event of a turbine load reduction. Each of the control mode selectors 74 associated with the valves generates an availability signal 76 if the selector 74 is in the automatic mode. The availability signals 76 are then transmitted to associate multipliers 78 which weight or bias the availability signal 76 to generate an individual capacity signal 80. The weighting factors $K_1$, $K_2$, $K_3$ and $K_4$ applied by the multipliers 78 correspond to the relative capacities in terms of percent power for the associated valves 52 identified as $V_1$, $V_2$, $V_3$ and $V_4$ respectively. The individual capacity signals 80 for the valves 52 in the automatic mode are then transmitted to a capacity summation means 82 where the individual capacity signals 80 are summed with the turbine load signal 46 to produce a total capacity signal 84. It should be noted that if any valves are in the manual ("M") mode, then no availability signal will be generated for those valves and accordingly no individual capacity signal will be generated. If the valves are inoperative due to repair or damage the associated control mode selector 74 will be placed in the M position.

The total capacity signal 84 is then transmitted to a lower selector means 86 where it is compared with a manual setpoint signal 88 indicative of a predetermined manually adjustable power level setpoint 87. This manual setpoint 87 is selected by the reactor operator and represents the desired power level to which the reactor should automatically be reduced in the event of a turbine load reduction which descends to a value below this setpoint. Normally this manually determined setpoint is set below the operating power level of the reactor 12. This setpoint can also be established in a manner to represent other operating limitations on the bypass valve system such as the need to insure that the condenser 36 is capable of handling steam diverted thereto by the bypass valve system 48. If the capability is present only to a limited degree, then the manual setpoint can be set low enough to insure that the condenser 36 will not be called on to handle a steam flow which exceeds its capacity. The low selector means 86 then generates a RRPLSP signal 90 which is equivalent to the lower power level of the capacity of the available bypass valves 52 and the manual setpoint. In this way, the RRPLSP is chosen so that it will fall within the capacity of the bypass valve system 48.

The RRPLSP signal 90 is then transmitted to a low limit means 92 which compares the RRPLSP signal 90 with the low limit signal 94 indicative of the low limit of automatic operation of the AMCM 42 and generates a low limited real reactor power level setpoint (LLRRPLSP) signal 112. The LLRRPLSP is the RRPLSP limited to a lower limit equivalent to the low limit of automatic control. This signal 112 is then transmitted to single pole double throw switch 114 which is normally positioned to close contact A as shown in FIG. 2 so as to pass the LLRRPLSP signal 112 which in turn becomes the FRPLSP signal 96. Accordingly, the FRPLSP signal 96 is normally equivalent to the LLRRPLSP signal 112 and ceases to be such only when the switch 114 is manually changed. The switch 114 is provided for the purpose of manually changing the FRPLSP signal 96 from the LLRRPLSP signal 112 to the low limit signal 94 in the situation where it is desirable to allow the reactor 12 to follow the turbine 34. This occurs generally after a turbine load reduction which is not temporary in nature. When the switch 114 is manually changed to close contact B, the low limit signal 94 is passed through the switch 114 to become the FRPLSP signal 96.

The limiting of the RRPLSP to a low limit equivalent to the low limit on automatic control, and thus limiting of the FRPLSP when switch 114 closes contact A, acts to enforce the administrative procedure of the prior art systems which required transfer to manual control of the control elements 16 below the predetermined power level. As noted before, this power level is generally of the order of 15% and accordingly, when switch 114 closes contacts A, the FRPLSP will be equal to the RRPSLSP for values of the RRPLSP above 15% and equal to 15% for values of the RRPLSP below 15%. If the switch 114 is positioned to close contact B, then the FRPLSP will manually be set at 15%.

The FRPLSP signal 96 is then transmitted to a comparator 98 which continuously compares the FRPLSP signal 96 with the reactor power signal 100. The reactor power signal 100 may be generated in a variety of ways. For the embodiment shown in FIG. 1 a neutron flux detector 102 is situated external to the core 14 and generates a signal which is commensurate with the neutron flux. This in turn approximates the reactor power. The comparator 98 for simplicity has been represented as a subtraction means 104 which subtracts the reactor power signal 100 from the FRPLSP signal 96 and generates a corresponding difference signal 106. If the resulting difference signal 106 is positive, then a binary "1" signal 108 is produced by binary signal generator 110. Such a signal 108 is indicative of the FRPLSP being greater than the reactor power. If a negative difference signal 106 results the binary signal generator 110 generates a "0" signal. The resulting signal 108 is termed the setpoint-greater-than-power signal and, for the embodiment shown in FIG. 2, is the motion inhibit signal 72 which is transmitted to the AMCM 42. The inhibit signal 72 operates to prevent operation of the AMCM 42 and accordingly to prevent automatic movement of the control elements 16. Only manual control is then permitted. The specific inhibition of response by the AMCM 42 to turbine load changes may be accomplished in a variety of well-known ways. For example, the inhibit signal 72 could actuate a relay switch to interrupt the output signals of the AMCM 42 which normally control the driving means 18 to insert or withdraw the control elements 16.

The inhibit signal 72 only exists when the FRPLSP is greater than the reactor power. During normal operation of the reactor 12, the switch 114 is positioned to close contact A and accordingly the FRPLSP is equivalent to the RRPLSP limited to have a low limit equivalent to the low limit on operation of the AMCM 42. Accordingly, as noted hereinabove, to insure that operation of the AMCM 42 is only inhibited for turbine load reductions, the manual setpoint 87 is adjusted to be below the operating power level. After a turbine load reduction, if the operator determines that it is desirable to allow the reactor 12 to follow the turbine 34, the single pole double throw switch 114 is manually switched to close contact B and the FRPLSP becomes equivalent to the low limit on automatic control of the reactor 12. This permits operation of the AMCM 42 unless and until the reactor power is lowered below the low limit on operation of the AMCM 42.

Accordingly, automatic reactor power reduction in response to turbine load reductions may be prevented when the reactor power level falls below the FRPLSP. This is best accomplished by manually adjusting the manual setpoint 87 to be at least slightly below the operating reactor power level. In this way, the automatic motion inhibit control system 70 allows the determination of the desirability of allowing the reactor 12 to follow or continue to follow the turbine 34. If the load reduction is only temporary and if the turbine 34 can be brought back up to its original load level, then the reactor power level may be permitted to remain at its elevated level. This will eliminate time-consuming delays in raising the reactor power if the turbine 34 is quickly brought back up to its original level after the reactor power has been reduced. On the other hand if the turbine load reduction does not appear to be temporary, the switch 114 may be manually switched to close contact B and the reactor 12 allowed to follow the turbine 34.

Figure 3:
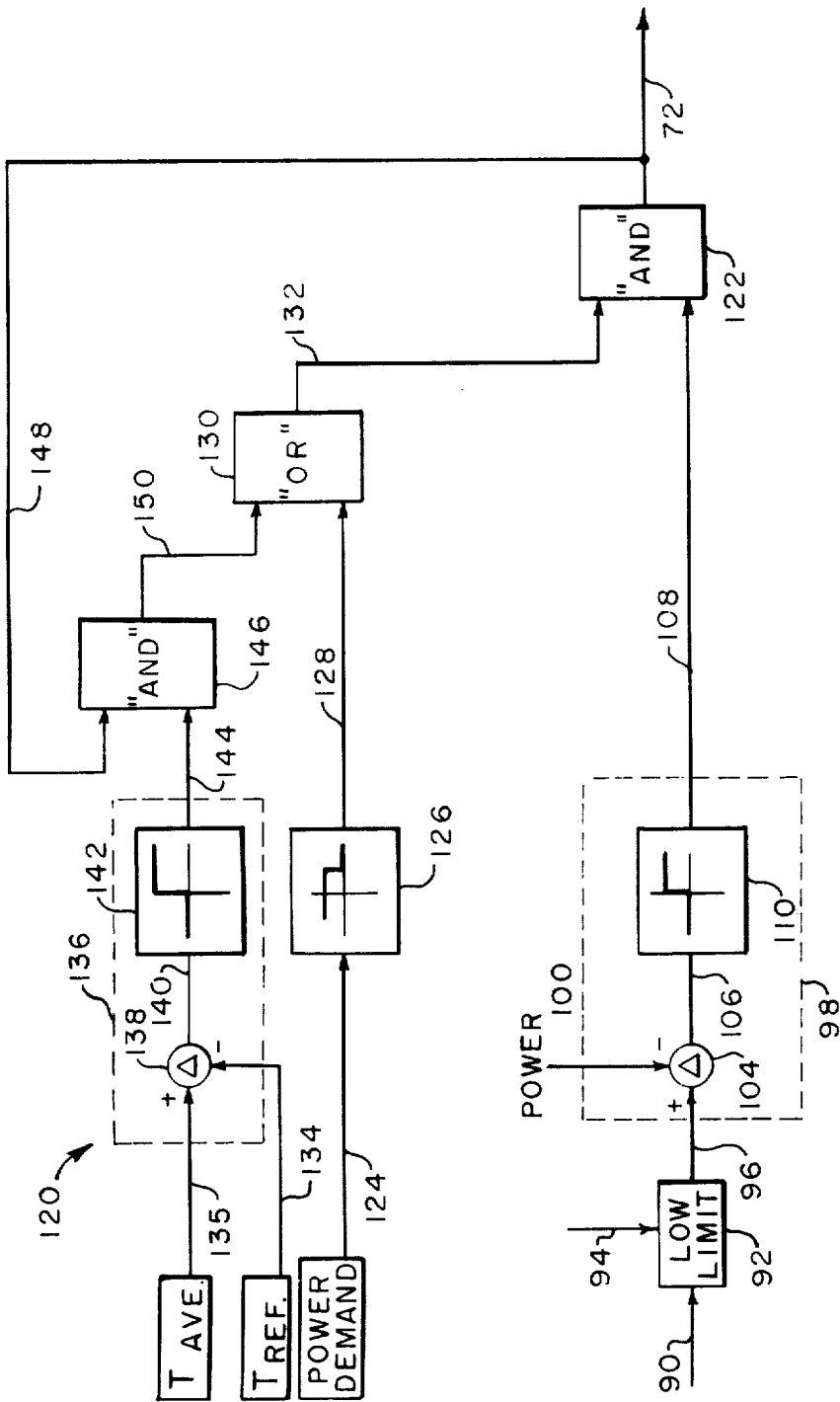
FIG. 3 is a schematic circuit diagram of a modified arrangement which utilizes a predetermined power demand setpoint and an inhibit locking system.

FIG. 3 discloses a modification for the automatic motion inhibit control system 70 of FIG. 2 for limiting the inhibition of reactor power reduction in response to turbine load reductions and also discloses an automatic lock-in system for preventing premature termination of the inhibit signal 72 as the turbine load is increased after a turbine load reduction. In this modified control system 120, the RRPLSP signal 90 is generated as shown with reference to FIG. 2 and then transmitted to the low means 92. The low limit means 92 which as before is responsive to both the RRPLSP signal 90 and the low limit signal 94, then generates the FRPLSP signal 96. For this modified control system 120, no switch 114 is provided. The FRPLSP signal 96 is then transmitted to comparator 98 as is the reactor power signal 110 which is generated as before with reference to FIG. 2. Also, as before the comparator 98 compares the two signals 96, 100 and then generates a binary "setpoint-greater-than-power" signal 108 if the FRPLSP is greater than the reactor power. This setpoint-greater-than-power signal 108 is then transmitted to the "AND" gate 122.

Instead of the setpoint-greater-than-power signal 108 being a motion inhibit signal 72 itself, the modified system 120 of FIG. 3 only generates an inhibit signal 72 when the turbine load falls below a predetermined load or power demand threshold. This is accomplished by generating a power demand signal 124 which is indicative of the reactor power demand. As noted hereinbefore the terms "reactor power demand" and "turbine load" are interchangeable since the reactor 12 is normally controlled to follow the turbine 34 and to be in agreement therewith. The reactor power demand signal 124 may be determined in a number of ways such as for example by the reference primary average coolant temperature as described hereinbelow. The power demand signal 124 is transmitted to binary signal generator 126 which is designed to generate a demand-less-than-threshold signal 128 only when the reactor power demand is less than a predetermined power demand threshold. When the demand-less-than-threshold signal 128 is produced, it is transmitted to "OR" gate 130 which may be responsive to a plurality of inputs, any one of which causes a binary inhibit desirability signal 132 to be generated. The inhibit desirability signal 132 is transmitted to the AND gate 122 which in turn will generate the motion inhibit signal 72 when both the inhibit desirability signal 132 and setpoint-greater-than-power signal 108 are present. The inhibit signal 72, as before, is then transmitted to the AMCM 42 to inhibit operation thereof.

Although the predetermined demand threshold may arbitrarily be selected, a suggested value is 15% of the full power output. The 15% limit for the demand threshold is preferable since it corresponds to the low limit on automatic operation of the AMCM 42. Also, generally speaking, it is only with reductions in load to house load (i.e. the load required to produce electricity to the nuclear power generating plant, generally of the order of 5–8%), with full load rejections, or with turbine trips, that it is most desirable to leave the reactor power at its elevated level. This is so since these load reductions, unlike most others, will often be followed soon by a return to the original load level.

After the inhibit signal 72 has been generated and the reactor power maintained at an elevated level above the power demand or turbine load, the desirability of leaving the reactor power at this elevated level may be determined. If the load reduction does not appear to be temporary, the reactor power may be reduced manually. If, however, the load reduction does appear to be temporary, the elevated power level may be maintained.

It should be noted that with the modified control system 120 shown in FIG. 3, it is not necessary to provide a manually adjustable setpoint 87 in order to insure that operation of the AMCM 42 will be inhibited only in response to turbine load reductions since the demand-less-than-threshold signal 128 accomplishes this purpose. However, it is still preferable to include the manual setpoint 87 for imposing other operating limitations on the bypass valve system 48. If no manual setpoint 87 is provided, the RRPLSP is just equivalent to the sum of the total capacity of the available bypass valves 52 and the turbine load 46.

As is apparent, after a turbine load reduction to below the demand threshold in which the reactor power has been maintained at an elevated level, it is desirable to prevent termination of the inhibit signal 72 as the turbine load is increased to a value above the demand threshold until the turbine load reaches the reactor power level. Otherwise, as the turbine load is increased past the demand threshold, the AMCM 42 would start reducing the reactor power. Accordingly the modified automatic motion inhibit control system 120 is designed to determine if the bypass valves 52 are diverting steam to the condenser 36 and then maintain generation of the inhibit signal 72 until the turbine load is brought back into agreement with the reactor power level. The primary average coolant temperature ($T_{AVE}$) is preferably used for this purpose as will be described hereinbelow although other parameters or conditions could be used such as the pressure error signal generated by the summation point 64 of the bypass control system 54.

A reference primary average coolant temperature ($T_{REF}$) signal 134 and a primary average coolant temperature ($T_{AVE}$) signal 135 are generated and transmitted to a comparator 136. The difference between $T_{REF}$ and $T_{AVE}$ is indicative of the bypass valves 52 being in operation to divert secondary coolant to the condenser 36 as will be apparent hereinbelow. At the comparator 136, the $T_{REF}$ signal 134 is subtracted from the $T_{AVE}$ signal 135 by subtraction means 138 which then generates and transmits a difference signal 140 to binary signal generator 142. The signal generator 142 will generate a binary 1 signal 144 indicative of the bypass valves 52 being in operation if the difference signal 140 is positive and will generate a binary 0 if the difference signal 140 is negative. The "valves-in-operation" signal 144 is then transmitted to AND gate 146 which is also responsive to the branch inhibit signal 148. If both the branch inhibit signal 148 and the valves-in-operation signal 144 are present, AND gate 146 will generate a lock-in signal 150 which is then transmitted to OR gate 130. As noted hereinbefore OR gate 130 will generate an inhibit desirability signal 132 in response to the presence of any of several inputs transmitted thereto. Accordingly, the lock-in signal 150 will prevent premature termination of the inhibit signal 72. When the reactor power demand reaches the reactor power level, the lock-in signal 150 will be terminated since the bypass valves 52 will no longer be in operation and the reactor 12 is allowed to thereafter follow the turbine 34. In this way, as the turbine load is increased past the demand threshold and the demand less than threshold signal 128 is terminated, the inhibit signal 72 will not be terminated until the turbine load reaches the reactor power level.

Figure 5:
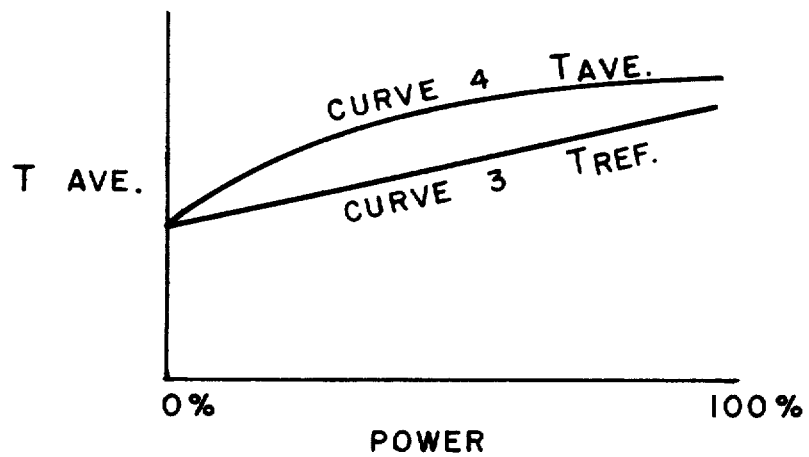
FIG. 5 is a plot of curves 3 and 4 for the power vs. primary average coolant temperature which correspond respectively to curves 1 and 2 of FIG. 4.

To best understand the reason for using $T_{REF}$ and $T_{AVE}$ for determining whether the bypass valves are in operation, reference to FIGS. 4 and 5 should be made. As hereinabove noted, curve 1 for FIG. 4 depicts the secondary steady state pressure vs. power curve for the system, the upper and lower pressure limits of 1000 and 900 psi representing typical secondary pressures at 0% power and 100% power, respectively. This curve represents the situation where the reactor power corresponds to the turbine load (i.e., all of the energy generated in the core 14 being directed to the turbine). Curve 2 of FIG. 4 represents the variable secondary pressure setpoint curve which is used by the pressure setpoint programmer 62 of the bypass control system 54. Also, as hereinabove described, if the turbine load is operative below the reactor power, the bypass valve control system 54 will control the valves 52 which are in the automatic mode to maintain the secondary pressure so as to lie along curve 2.

Due to the interrelation of secondary pressure and secondary coolant temperature and also the interrelation between secondary coolant temperature and primary average coolant temperature, corresponding curves of primary average coolant temperature vs. reactor power can be generated which correspond to curves 1 and 2 of the plot in FIG. 4. These curves are depicted in FIG. 5 as curves 3 and 4 respectively. Curve 3 represents the steady state primary average coolant temperature vs. power which is provided by the AMCM 42 and curve 4 represents the primary average coolant temperature vs. power which is provided by the bypass valve control system 54.

As noted previously, the $T_{REF}$ and $T_{AVE}$ are the parameters used to be indicative of the bypass valves 52 being in operation. Curve 3 is termed the reference primary average temperature curve since it represents $T_{AVE}$ as a function of power for the steady state conditions, i.e., when the turbine load corresponds to the reactor power. That is, the AMCM 42 controls the driving means 18 to maintain $T_{AVE}$ to lie along curve 3 depending upon the turbine load for the steady state condition of turbine load corresponding to reactor power. However, if the turbine load is below the reactor power level and the bypass valves 52 are in operation maintaining the secondary pressure along curve 2, then as can be appreciated, $T_{AVE}$ will correspondingly lie along curve 4. In essence the bypass valve control system 54 is maintaining the $T_{AVE}$ to lie along curve 4 depending on the reactor power when the bypass valves 52 are in operation. Of course this is contingent on the AMCM 42 not operating to drive $T_{AVE}$ back down to fall on curve 3. In this situation, $T_{AVE}$ will be significantly greater than the reference primary average temperature since curve 3 lies below curve 4. Also, since the turbine load will be less than the reactor power, the reference primary average temperture will lie further to the left (toward lower power levels) along curve 3.

Accordingly, when the bypass valve system 48 is in operation diverting the steam in the secondary coolant system 26 to the condenser 36 $T_{AVE}$ will be significantly higher than $T_{REF}$. In terms of the control circuit of FIG. 3, this means that the valves-in-operation signal 144 will be generated by the comparator 136. Only when the turbine load slightly exceeds the reactor power thus closing the bypass valves 52 will $T_{AVE}$ converge towards $T_{REF}$. Therefore since the significant difference will exist between $T_{AVE}$ and $T_{REF}$ while the turbine load is being brought up to correspond with the reactor power, and since this difference will disappear when the turbine load overtakes the reactor power, the use of the $T_{REF}$ and $T_{AVE}$ signals 134, 135 for this application is preferred.

In summary then, there is disclosed an automatic motion inhibit control system 120 in which reactor power reduction in response to turbine load reduction is inhibited only when the turbine load is reduced to a value below a predetermined demand threshold. More particularly an inhibit signal 72, which is transmitted to the AMCM 42 of the nuclear power generating system 10, is generated when the FRPLSP is greater than the reactor power, and when the reactor power demand is less than predetermined demand threshold. The inhibit signal 72 prevents response by the AMCM 42 to reduce the reactor power in accordance with the turbine load reduction. Also there is disclosed an automatic lock-in system for preventing permature termination of the inhibit signal 72 as the turbine load is increased above the predetermined demand threshold.

The present invention is practiced with the electrical portions of the control system embodied as analog control circuitry or as digital control circuitry. When digital hardware is employed a programmed digital process computer can be included in the control circuitry. The use of such circuitry for the electrical portions of control systems is well known in the art an accordingly it is not deemed necessary to detail such circuitry herein.

It will be understood that the embodiments shown and described herein are merely illustrative and that changes may be made without departing from the scope of the invention as claimed.

What is claimed is:

1. A nuclear power generating system comprising:
   coolant vapor generating apparatus including a nuclear reactor having a nuclear core and a plurality of control elements movable within said core for controlling the power output thereof;
   a turbine for receiving coolant vapor produced by said vapor generating apparatus;
   coolant circuitry for said vapor generating apparatus and said turbine including means for delivering vapor to said turbine;
   coolant vapor relief means in said coolant circuitry operable to cause at least some of the coolant vapor to be diverted from said turbine, said coolant vapor relief means including a plurality of coolant vapor relief valves, at least some of said valves being operable automatically to divert coolant vapor;
   means for generating a turbine load signal proportional to the quantity of steam received by said turbine;
   means responsive to said reactor for generating a reactor power output signal commensurate with the reactor power output;
   automatic motion control means responsive to turbine load and the power output of said nuclear core for automatically controlling the motion of said control elements within said nuclear core to adjust the power output of said nuclear core to be equal to turbine load;
   adjustable means for generating a predetermined reactor power level setpoint signal above which it is undesirable to inhibit automatic control element motion produced by said automatic motion control means;
   means responsive to said coolant vapor relief means for producing a total valve capacity signal proportional to the power level corresponding to the total capacity of said coolant vapor relief valves which are operable automatically to divert coolant vapor;
   means responsive to said predetermined reactor power level setpoint signal, said turbine load signal and said total capacity signal for producing a signal commensurate with the lower of said predetermined reactor power level setpoint signal and the sum of said turbine load signal and said total valve capacity signal, said resultant signal being the real reactor power level setpoint signal;
   means responsive to said real reactor power level setpoint signal for limiting said signal to values greater than or equal to a predetermined minimum value below which the nuclear power system's control systems become unstable, said limited signal being the final reactor power level setpoint signal;
   means responsive to said final reactor power level setpoint signal and said reactor power output signal for producing a motion inhibit signal only when the final reactor power level setpoint is greater than the reactor power output; and
   means responsive to said motion inhibit signal for inhibiting said automatic motion control means from responding to changes in turbine load.

2. The power generating system of claim 1 wherein each of said coolant vapor relief valves are operable in an automatic mode and a manual mode, and wherein said means for producing said total capacity signal comprises: means responsive to the capacity and mode of each of said coolant vapor relief valves for producing an individual capacity signal for each of said coolant vapor relief valves which is in the automatic mode, said individual capacity signals each being indicative of the capacity of its corresponding coolant vapor relief valve; and means for summing said individual capacity signals to produce said total capacity signal.

3. The power generating system of claim 2 wherein said automatic motion control means is inoperative below said predetermined minimum value and wherein said means for producing said final reactor power level setpoint comprises: means for producing a signal commensurate with the real reactor power level setpoint when the real reactor power level setpoint is greater than said predetermined minimum value and means for producing a signal commensurate with said predetrmined minimum value when the real reactor power level setpoint is less than said predetermined minimum value.

4. A method of operating a nuclear vapor generating system which includes a nuclear reactor having a nuclear core, a plurality of control elements movable within the core for controlling the power output thereof, means for converting the heat generated in the nuclear core into coolant type vapor, a turbine for receiving coolant vapor, coolant vapor relief means operable to cause at least some of the coolant vapor to be diverted from the turbine said coolant vapor relief means including a plurality of coolant vapor relief valves, at least some of which are operable automatically to divert coolant vapor and automatic motion control means responsive to changes in the turbine load for automatically controlling the motion of the control elements to change the reactor power output to be in accordance with the turbine load, the automatic motion control means being inoperative below a predetermined minimum value due to the onset of control instability, the method comprising the steps of:

generating a first reactor power level setpoint signal indicative of the total capacity of the nuclear vapor generating system to carry coolant vapor away from said nuclear core wherein the step of generating said first reactor power level setpoint signal comprises the steps of:

generating an adjustable setpoint signal indicative of an adjustable predetermined power setpoint above which it is undesirable to inhibit automatic control element motion produced by said automatic control means;

generating a total capacity signal indicative of the sum of the total capacity of the coolant vapor relief valves operable automatically to divert coolant vapor and the capacity of the turbine to receive coolant vapor;

comparing said adjustable signal and said total capacity signal; and generating a signal indicative of the lower of said adjustable setpoint and said total capacity signals;

generating a low limit signal indicative of said predetermined minimum value;

limiting said first reactor power level setpoint signal to values larger than said low limit signal to obtain a second reactor power level setpoint signal;

measuring the reactor power level and generating a reactor power signal commensurate therewith;

comparing said second reactor power level setpoint signal and said power signal; and generating a motion inhibit signal to inhibit the automatic motion control means for responding to a change in turbine load only when said second reactor power level setpoint signal is greater than said reactor power signal.

5. The method of claim 4 further including the step of adjusting said adjustable setpoint to be below the reactor power so that the automatic motion control means is only inhibited from responding to turbine load reductions.

6. The method of claim 5 in which each of the coolant vapor relief valves is operable in an automatic mode and a manual mode and wherein the step of generating said total capacity signal includes the step of:

generating an individual capacity signal for each of said valves which is in the automatic mode and summing said individual capacity signals.

* * * * *